United States Patent [19]

Putnam

[11] Patent Number: 4,860,791
[45] Date of Patent: Aug. 29, 1989

[54] STRAIN RELIEF CLAMP FOR WASHING MACHINE DRAIN HOSE

[75] Inventor: Brett J. Putnam, Ripon, Wis.

[73] Assignee: Speed Queen Company, Ripon, Wis.

[21] Appl. No.: 280,471

[22] Filed: Dec. 5, 1988

[51] Int. Cl.$^4$ ............................................. F16L 5/00
[52] U.S. Cl. ..................... 137/565; 248/56; 285/162; 285/903; 312/229
[58] Field of Search ................. 137/360, 565; 68/208, 68/211; 285/162, 903; 248/56; 312/229

[56] References Cited

U.S. PATENT DOCUMENTS

| | | | |
|---|---|---|---|
| 3,243,206 | 3/1966 | Samer | 285/162 |
| 3,288,407 | 11/1966 | Downer et al. | 248/56 |
| 3,366,356 | 1/1968 | Fisher | 248/56 |
| 4,192,477 | 3/1980 | Decky et al. | 285/162 X |
| 4,299,363 | 11/1981 | Datschefski | 248/56 |
| 4,711,472 | 12/1987 | Schnell | 285/162 |
| 4,723,796 | 2/1988 | Nattel | 285/162 |
| 4,729,534 | 3/1988 | Hill et al. | 248/56 |

Primary Examiner—John Rivell
Attorney, Agent, or Firm—William R. Clark; Richard M. Sharkansky

[57] ABSTRACT

A strain relief clamp for a washing machine drain hose which includes a pair of hinged clamp members each having a plastic plate with a semi-circular indent adapted for receiving a corrugated drain hose from opposite sides thereby completely surrounding and clamping the drain hose. Each clamp member has a wall which is perpendicular to the plate, which wall members cooperatively form a neck which conforms to the shape of the aperture through which the drain hose exits the washer cabinet. Each wall has a plurality of locking tabs such that when the neck is inserted into the aperture until the plates contact the cabinet panel, the locking tabs snap into place and prevent removal of the strain relief clamp. The hose is thereby securely clamped at its exit through the cabinet panel thereby providing strain relief for the interconnection between the drain hose and the pump.

10 Claims, 3 Drawing Sheets

STRAIN RELIEF CLAMP FOR WASHING MACHINE DRAIN HOSE

BACKGROUND OF THE INVENTION

The field of the invention generally relates to washing machines, and more particularly relates to apparatus for securing the drain hose to peripheral portions of the aperture through which it exits the washer cabinet so as to provide strain relief for the hose connection to the pump.

As is well known, automatic washing machines generally have a pump that pumps the wash and rinse water through a drain hose to a household drain pipe at the completion of respective washing cycles. It is also generally known that it is desirable to provide strain relief for the connection between the drain hose and the pump so that an external pulling force on the drain hose will not disconnect or loosen the drain hose from the pump. Another general requirement is that the drain hose be protected from wearing or cutting at the washer cabinet aperture as a result of flexing or other motion of the drain hose.

In one prior art approach to securing the drain hose and providing strain relief, a drain hose fitting in the form of an elbow with a flange is inserted through a cabinet aperture, and then a plurality of screws are used to attach the flange to the cabinet panel. Typically, smooth rubber hose is used with this arrangement, and a short length of hose is interconnected between the pump and the inside end of the elbow fitting using hose clamps. A drain hose which runs to the household drain is then connected to the outside end of the elbow fitting using a hose clamp. Accordingly, if a force is exerted on the drain hose, the outside connection to the elbow fitting may become loose or disengaged, but the force is not transferred to the inside connection to the pump. Therefore, the elbow fitting provides strain relief for the connections internal to the washer cabinet. This arrangement also has an advantage in that it typically is not subject to wearing or cutting at the elbow joint. However, this construction is relatively expensive because, in addition to the high cost of rubber hose, a plurality of parts including separate lengths of hose are required. Further, the assembly labor costs are relatively expensive because the elbow fitting has to be screwed to the back panel of the cabinet and all of the hose fittings have to be manually clamped.

In another prior art approach, a continuous piece of corrugated plastic drain hose is used. Accordingly, separate lengths of hose do not have to be interconnected such as at the elbow fitting described above. After extending the hose through the cabinet aperture, it is inserted through a circular hole in a small plate, and then a plurality of hose retainer clips are seated into a groove of the corrugated hose. Next, the retainer clips are affixed to the plate so that the plate is then secured to the hose. Finally, the plate is positioned so as to cover the hose exit aperture from the cabinet panel, and the plate is affixed to the panel using a screw. Such arrangement not only provides strain relief for the hose connection to the pump, but also there are no other fittings such as at the above-described elbow joint that could come loose if a force were exerted on the hose. However, this construction is still relatively expensive because it uses several parts and the fabrication process is labor intensive. That is, manual manipulation is required to connect the retainer clips to the hose and the plate, and also the plate has to be screwed to the cabinet. Further, excessive flexing of the drain hose may cause wear or cutting where the hose contacts the retainer clips.

SUMMARY OF THE INVENTION

It is an object of the invention to provide improved apparatus for securing the drain hose at its exit aperture through the washer cabinet.

It is another object to provide a drain hose clamp that securely affixes the drain hose to the cabinet panel at the exit aperture so as to provide strain relief for the connection of the hose to the pump. It is also an object to provide such a clamp using a minimum of parts. It is a further object to provide such a clamp that can be easily installed so as to reduce labor assembly costs.

It is a further object to provide a strain relief drain hose clamp that is not subject to wearing or cutting the drain hose.

In accordance with the invention, these and other objects and advantages are provided by apparatus adapted for securing a drain hose to peripheral portions of the aperture through which the drain hose exits a clothes washer cabinet, the apparatus comprising first and second clamp members each having a substantially arcuate notch adapted for receiving the drain hose on opposite sides and cooperatively forming a collar around the drain hose, and means connected to the first and second clamp members and insertable through the aperture for cooperatively snap locking the first and second clamp members to the peripheral portions of the aperture wherein the drain hose is secured to the washer cabinet at the point of exit. It is preferable that the first and second clamp members be connected together by a living hinge. Further, it is preferable that the first and second clamp members comprise a plate and that the snap locking members comprise a wall member perpendicular to the plate and having a shape substantially conforming to a portion of the perimeter of the aperture, the snap locking means further comprising outwardly extending locking tabs resiliently suspended from the wall. It is also preferable that the hose have a rib and a groove, and that the first and second clamp members be seated in the groove and engaging the ribs to prevent longitudinal movement of the apparatus along the drain hose. With such arrangement, a collar clamp is provided that is readily engageable to the hose and to peripheral portions of the exit aperture so as to provide strain relief for the connection of the hose to the pump.

The invention may also be practiced by the method of securing a drain hose to peripheral portions of an aperture in a washing machine cabinet through which the drain hose passes, comprising the steps of engaging opposing sides of the drain hose with the clamp members comprising plates having semi-circular notches for receiving the drain hose and forming a collar therearound, the clamp members further having wall portions perpendicular to the plates and conforming to the perimeter of the aperture, inserting the wall portions through the aperture, and providing the wall portions with snap locking tabs which resiliently bend outwardly after passage through the aperture thereby preventing removal of the clamp from the aperture.

BRIEF DESCRIPTION OF THE DRAWINGS

The foregoing objects and advantages will be more fully understood by reading the Description of the Preferred Embodiment with reference to the drawings wherein.

DESCRIPTION OF THE PREFERRED EMBODIMENT

Figure 1:
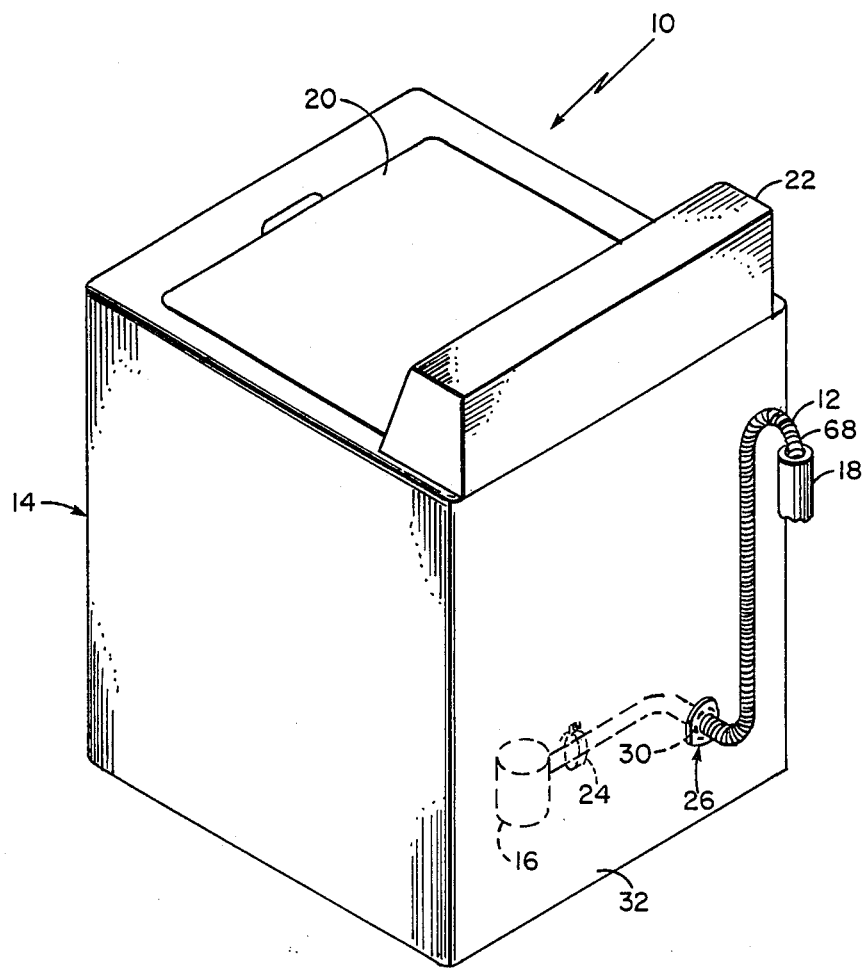
FIG. 1 is a rear perspective view of an automatic washing machine.

With general reference to the drawings wherein like reference numerals refer to like parts throughout the several views, the invention includes a strain relief clamp 26 which is adapted for securing a corrugated drain hose 12 to peripheral portions 28 of the aperture 30 through which the drain hose 12 exits a clothes washer cabinet 14. The strain relief clamp 26 includes first and second clamp members 34 each having a plate 38 with a substantially arcuate notch 40 which is adapted for receiving the drain hose 12 on opposite sides and cooperatively forming a collar around the drain hose 12. The strain relief clamp 26 further includes walls 44 which are perpendicular to the plates 38 and which have locking tabs 62 which snap lock the clamp members 34 together around the drain hose 12 after insertion of the walls 44 through the aperture 30 in the cabinet 14. Accordingly, apparatus is provided that easily and readily secures the drain hose 12 to peripheral portions 28 of the cabinet aperture 30 so as to provide strain relief for the connection of the drain hose 12 to the pump 16.

Referring now specifically to FIG. 1, a rear perspective view of household automatic washing machine 10 shows a continuous length of drain hose 12 that passes through cabinet 14 and is used to convey wash and rinse water from pump 16 to household drain pipe 18. As is well known, the lid 20 of cabinet 14 is first opened and clothes are inserted into washing machine 10. Then, after adding detergent, suitable control knobs (not shown) on the front of control console 22 are used to activate washing machine 10. At the completion of the washing cycle, pump 16 discharges the wash water through drain hose 12 and after the completion of one or more rinse cycles, pump 16 discharges rinse water through drain hose 12. Drain hose 12 is connected to pump 16 using a suitable conventional connector such as a hose clamp 24.

Figure 2:
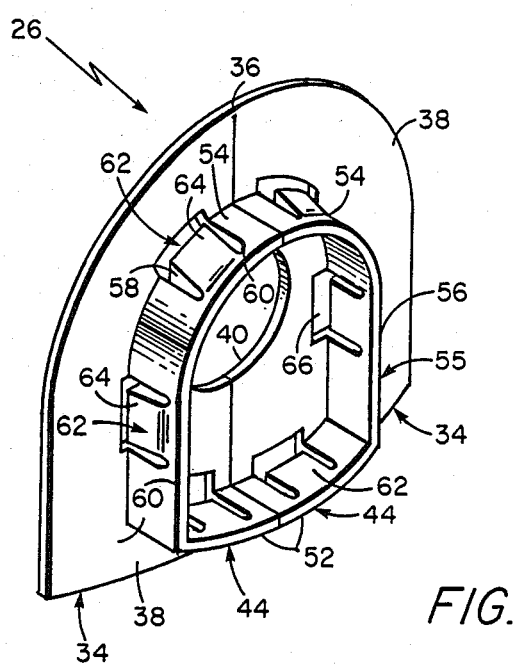
FIG. 2 is a perspective view of the strain relief clamp.
Figure 3:
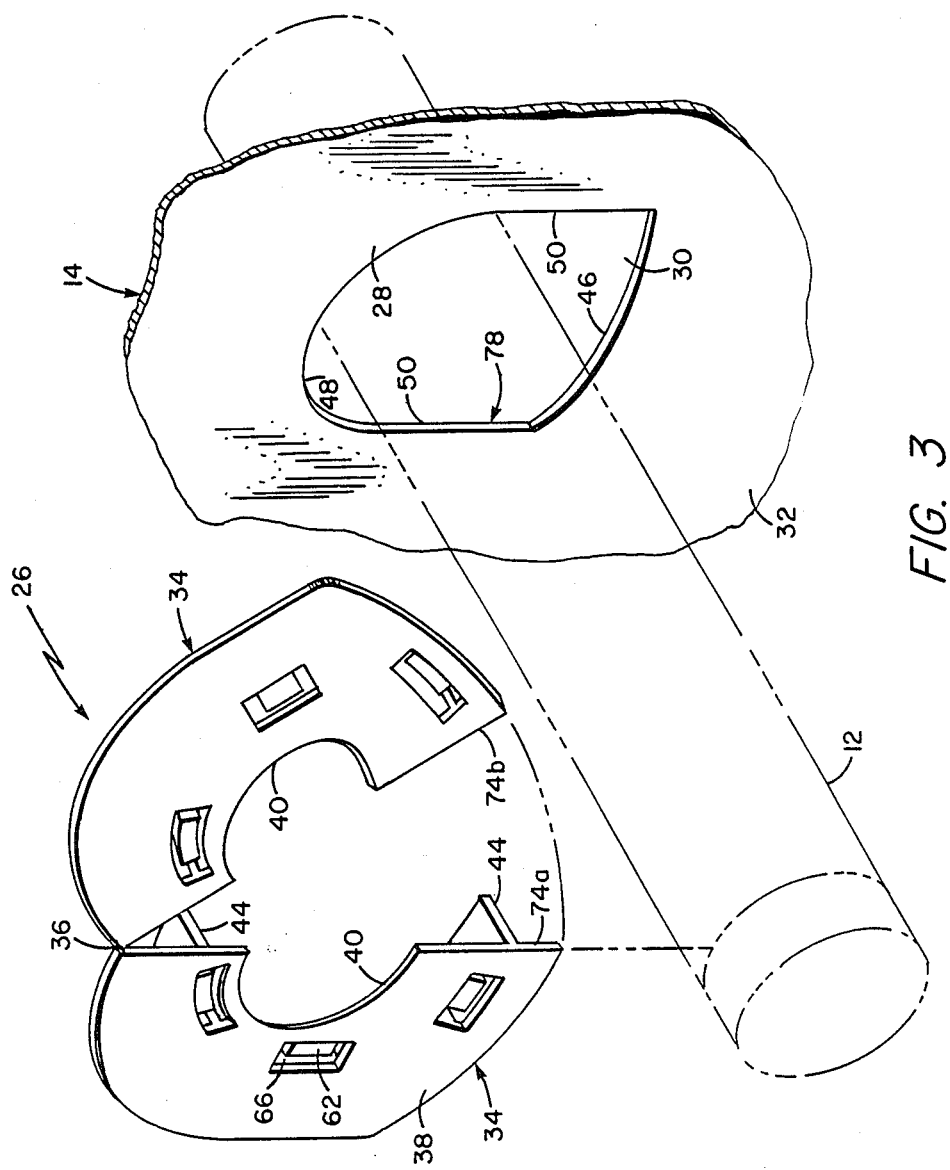
FIG. 3 is an exploded view of the strain relief clamp aligned for clamping the drain hose and insertion into the cabinet aperture.

Still referring to FIG. 1 and also to FIGS. 2 and 3, a strain relief clamp 26 is used to secure drain hose 12 to peripheral portions 28 of the cabinet aperture 30 through which drain hose 12 exits the back panel 32 of cabinet 14. Strain relief clamp 26 is here molded from a suitable plastic such as, for example, polypropylene and includes two symmetrical clamp members 34 or collar portions that are pivotally interconnected by living hinge 36. Accordingly, respective collar portions are interconnected but are free to be rotated with respect to each other so as to open and close strain relief clamp 26.

Each clamp member 34 includes a plate 38 or flange having a semi-circular notch or collar 40 that, as will be described later herein, is sized to receive and seat in a groove 42 (FIG. 4) of drain hose 12. Each flange 38 or plate also has a perpendicular wall 44 that is bounded so as generally to conform to half the shape of aperture 30. More specifically, with reference to FIG. 3, drain hose exit aperture 30 through back panel 32 of cabinet 14 is a noncircular badge-shaped opening having a relatively large radius arcuate bottom portion 46, a relatively small radius arcuate top portion 48, and two parallel straight interconnecting sides 50. Although many other shapes could be used, and the particular shape described was chosen for reasons unrelated to the present invention, it is preferable that exit aperture 30 be noncircular so that when strain relief clamp 26 is snap locked in place as will be described, rotation of strain relief clamp 26 within aperture 30 is prevented. Referring again to FIG. 2 and the strain relief clamp 26, the wall 44 of each clamp member 34 here defines a relatively large radius arcuate section 52 which is approximately half the length of arcuate portion 46, a relatively small radius arcuate section 54 that is approximately half the length of portion 48, and a straight interconnecting side section 56. Accordingly, when clamp members 34 are positioned such that strain relief clamp 26 is closed as shown in FIG. 2, walls 44 of corresponding clamp members 34 cooperate to form a continuous wall or neck 55 that generally conforms to and is slightly smaller than aperture 30 such that walls 44 can be snugly pushed through aperture 30 thereby retaining strain relief clamp 26 in the closed position.

Each wall 44 has a plurality of cut out notches 58 forming a band 60 along the upper edge from which locking tabs 62 are connected. Each locking tab 62 extends toward flange 38 and has a ramp or inclined surface 64 which resiliently projects outwardly from wall 44. Accordingly, an inward force on surface 64 bends a locking tab 62 inwardly, and after the force is removed, locking tab 62 snaps back to its original position with inclined surface 64 extending outwardly from the outer perimeter of neck 55. Flange 38 also has a cut out notch 66 below each locking tab 62.

In the assembly of washing machine 10, one end of drain hose 12 is connected to pump 16 using a suitable fastener such as hose clamp 24, and the other end 68 is passed through drain hose exit aperture 30 in the back panel 32 of cabinet 14. Drain hose 12 is here a continuous blow molded part fabricated of a suitable plastic such as, for example, polyethylene so as to provide flexibility. Drain hose 12 is corrugated. That is, drain hose 12 is of rib 70 and groove 42 construction. In one embodiment, drain hose 12 has a single continuous spiral rib 70, and in an alternate embodiment, there are a plurality of individual parallel ribs 70 with a groove 42 between each two adjacent ribs 70. With either embodiment of drain hose 12, strain relief clamp 26 with hinge 36 open as shown in FIG. 3 is positioned next to drain hose 12 immediately adjacent to and on the outside of cabinet 14 with wall 44 facing aperture 30. Then, clamp members 34 are rotated together at living hinge 36 such that clamp members 34 close down around drain hose 12 with the notch 40 or collar seating into a groove 42. The radius of collar or notch 40 is smaller than the radius of rib 70 such that when strain relief clamp 26 is closed, it clamps down on the drain hose 12 and axial motion of strain relief clamp 26 along drain hose 12 is prevented. Although clamp members 34 could be individual separate parts, the hinge 36 between clamp members 34 simplifies the manual manipulation of closing strain relief clamp 26. When a drain hose 12 has individual parallel ribs 70 such that there are separate annular grooves 42, the edges 74a and b of clamp members 34 at the distal ends from hinge 36 engage each other. However, when a drain hose 12 has a continuous spiral rib 70 such that there is a continuous spiral groove 42, the distal edges 74a and b are offset by the width of one rib 70. In either case, walls 44 of respective clamp members 34 cooperatively form a continuous neck 55 that is axial to drain hose 12 and conforms to the shape of aperture 30.

Figure 4:
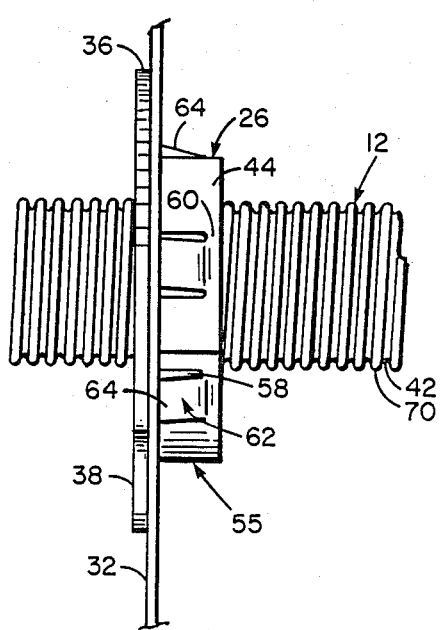
FIG. 4 is a side view of the strain relief clamp engaged to the cabinet panel.
Figure 5:
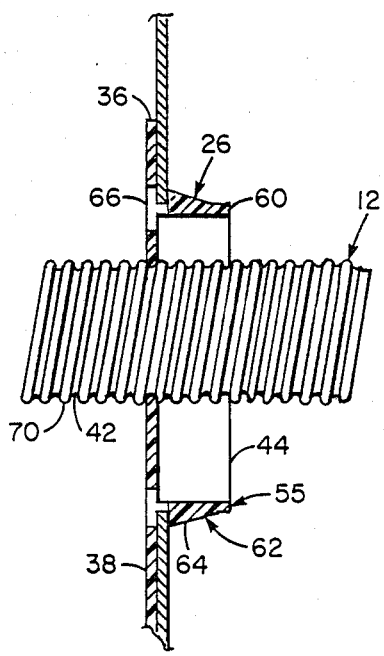
FIG. 5 is a cross-sectional view of the strain relief clamp taken through locking tabs as secured to the cabinet panel.

Referring to FIGS. 4 and 5, strain relief clamp 26 in its closed clamping position around drain hose 12 is oriented such that the parts of neck 55 align with the corresponding parts of aperture 30 such that neck 55 can be pushed into aperture 30 until flange or plate 38 seats against panel 32 and covers cabinet aperture 30. As neck 55 is pushed into aperture 30, the ramp or inclined surfaces 64 slide against perimeter edges 78 exerting an inward force on locking tabs 62. Accordingly, locking tabs 62 bend inwardly from band 60. As flange 38 approaches and engages peripheral portions 28 of back panel 32 around aperture 30, locking tabs 62 pass completely through aperture 30 past edges 78 such that locking tabs 62 resiliently snap outwardly to their normal position as shown in FIG. 5. The outline defined by locking tabs 62 in their relaxed position is larger than the perimeter of aperture 30 and therefore clamp members 34 cooperatively lock together securing drain hose 12 to peripheral portions 28 of aperture 30. Strain relief clamp is made of flexible plastic so that even if there is an offset between edges 74a and b as a result of using a drain hose 12 with a continuous spiral rib 70, flanges 38 and walls 44 will bend such that all locking tabs 62 will engage peripheral portions 28. In the embodiment shown, each clamp member 34 has three locking tabs, and flanges 38 and walls 44 would bend thereby enabling all three locking tabs 62 to pass completely through aperture 30.

In accordance with the invention, the two clamp members 34 of strain relief clamp 26 cooperatively snap lock into aperture 30 and securely clamp drain hose 12 at that point. Accordingly, an outward force on drain hose 12 exerts a pulling force on strain relief clamp 26 and peripheral portions 28 of cabinet panel 32, but the force is not transferred to the interconnection between drain hose 12 and pump 16. Accordingly, strain relief clamp 26 provides a secure nonrotatable attachment of drain hose 12 to back panel 32 thereby providing strain relief for the drain hose 12 connection to pump 16. Also, there is no drain hose 12 interconnection to a fitting at back panel 32, so there is no interconnection that could become loose or disengage. In other words, there is a continuous length of drain hose 12 that passes completely through back panel 32 so potential leaks at this location are avoided. Further, strain relief clamp 26 is a single inexpensive part that can be installed with a minimal amount of labor. Stated differently, strain relief clamp 26 can be easily and readily clamped around drain hose 12 and engaged to peripheral portions 28 of aperture 30 with very little manual manipulation. Further, the clamping of the drain hose is around the entire perimeter of a groove 42 such that there is not a localized retainer clip that could lead to cutting or wearing as a result of flexing drain hose 12.

This concludes the Description of the Preferred Embodiment. However, a reading of it by one skilled in the art will bring to mind many alterations and modifications without departing from the spirit and scope of the invention. Accordingly, it is intended that the scope of the invention be limited only by the appended claims.

What is claimed is:

1. Apparatus adapted for securing a corrugated drain hose having a rib and a groove to peripheral portions of an aperture through which the drain hose exits a clothes washer cabinet, the apparatus comprising:

first and second clamp members each having a substantially arcuate notch adapted for receiving said drain hose on opposite sides and cooperatively forming a collar around said drain hose, said first and second clamp members each having a predetermined thickness adapted for seating in said groove and engaging said rib wherein said hose is prevented from being pulled through said collar; and means connected to said first and second clamp members and insertable through said aperture for cooperatively snap locking said first and second clamp members to said peripheral portions of said aperture wherein said drain hose is secured to said washer cabinet at the point of exit.

2. The apparatus recited in claim 1 wherein said first and second clamp members are connected by a hinge.

3. The apparatus recited in claim 2 wherein said hinge is a living hinge.

4. The apparatus recited in claim 1 wherein each of said first and second clamp members comprises a plate, said snap locking means comprising a wall member perpendicular to said plate and having a shape substantially conforming to a portion of the perimeter of said aperture, said snap locking means further comprising outwardly extending locking tabs resiliently suspended from said wall.

5. A clamp adapted for securing a corrugated drain hose to peripheral portions of an aperture through which the drain hose exits a cabinet of a clothes washer so as to provide strain relief for a connection of the hose to a pump of the clothes washer, said clamp comprising:

first and second clamp members each comprising a plate having a substantially semi-circular notch wherein said notches are adapted for receiving said corrugated drain hose from opposite sides and seating into a groove of said corrugated drain hose thereby substantially forming a circumferential collar around said drain hose;

means for holding said first and second clamp members together within said aperture and around said drain hose, said holding means comprising first and second cooperating wall members extending perpendicularly from said respective first and second clamp members and substantially conforming to the perimeter of said aperture for insertion therethrough; and means for affixing said clamp members to said cabinet, said affixing means comprising resilient locking tabs extending outwardly from said wall members, said locking tabs being adapted for bending inwardly by contacting perimeter edges of said aperture as said wall members are inserted through said aperture and then snapping outwardly after passing through said aperture thereby preventing said first and second clamp members rom being withdrawn from said aperture.

6. The clamp recited in claim 5 further comprising a hinge interconnecting said first and second clamp members.

7. The clamp recited in claim 6 wherein said hinge comprises a living hinge.

8. In a washing machine, the combination comprising a pump for pumping liquid from a tub, a corrugated drain hose having a rib and a groove for conveying the liquid from the pump to a household drain, an outer cabinet having an aperture through which the drain hose passes, and means for providing strain relief for the connection between the drain hose and the pump, the providing means comprising a pair of conforming clamp members each having a plate with a semi-circular notch for seating against opposing sides of the drain hose and forming a collar around the drain hose, at least a portion of the clamp members being disposed in said groove engaging said rib wherein said drain hose is prevented from being pulled through said collar, the clamp members comprising perpendicular wall portions conforming to the aperture of the cabinet for insertion therethrough, the wall members having resilient locking tabs for engaging wall portions of the cabinet and securing the drain hose to the cabinet at the exit aperture.

9. The method of securing a corrugated drain hose having a rib and a groove to peripheral portions of an aperture in a washing machine cabinet through which the drain hose passes, comprising the steps of:
    engaging opposing sides of said drain hose with clamp members comprising plates having semi-circular notches for receiving said drain hose and forming a collar therearound, said clamp members seating in said groove and engaging said rib wherein said drain hose is prevented from being pulled through said collar, said clamps members further having wall portions perpendicular to said plates and conforming to the perimeter of said aperture;
    inserting said wall portions through said aperture; and
    providing said wall portions with snap locking tabs which resiliently bend outwardly after passage through said aperture thereby preventing removal of said clamp members from said aperture.

10. The method recited in claim 9 further comprising the step of providing said clamp members with an interconnecting hinge.

* * * * *